(12) United States Patent
Zhang

(10) Patent No.: US 10,670,914 B2
(45) Date of Patent: Jun. 2, 2020

(54) BACKLIGHT CONTROL METHOD AND DEVICE AND LIQUID CRYSTAL DISPLAY DEVICE

(71) Applicants: HISENSE VISUAL TECHNOLOGY CO., LTD., Qingdao (CN); HISENSE INTERNATIONAL CO., LTD., Qingdao (CN); HISENSE USA CORPORATION, Suwanee, GA (US)

(72) Inventor: Yuxin Zhang, Qingdao (CN)

(73) Assignees: Qingdao Hisense Electronics Co., Ltd., Qingdao (CN); Hisense International Co. Ltd., Qingdao (CN); Hisense USA Corporation, Suwanee, GA (US)

( * ) Notice: Subject to any disclaimer, the term of this patent is extended or adjusted under 35 U.S.C. 154(b) by 169 days.

(21) Appl. No.: 15/857,595

(22) Filed: Dec. 28, 2017

(65) Prior Publication Data

US 2018/0246375 A1 Aug. 30, 2018

(30) Foreign Application Priority Data

Feb. 28, 2017 (CN) .......................... 2017 1 0109740

(51) Int. Cl.
*G09G 3/36* (2006.01)
*G02F 1/13357* (2006.01)
*G09G 3/34* (2006.01)

(52) U.S. Cl.
CPC ..... *G02F 1/133602* (2013.01); *G09G 3/3426* (2013.01); *G09G 3/36* (2013.01);
(Continued)

(58) Field of Classification Search
USPC .... 345/690, 691, 102, 77, 87, 589, 591, 593
See application file for complete search history.

(56) References Cited

U.S. PATENT DOCUMENTS

2011/0057961 A1* 3/2011 Tsuru ................... G09G 3/342
345/690
2012/0182332 A1* 7/2012 Liu ..................... G09G 3/2007
345/691
(Continued)

FOREIGN PATENT DOCUMENTS

CN 101211537 A 7/2008
CN 101222537 A 7/2008
(Continued)

OTHER PUBLICATIONS

The Chinese First Examination Report of corresponding China patent application No. 201710109740.2, dated Jun. 26, 2018.

*Primary Examiner* — Thuy N Pardo
(74) *Attorney, Agent, or Firm* — J.C. Patents

(57) ABSTRACT

A backlight control method is provided. The method includes: determining, based on a global backlight brightness value, a backlight brightness interval in which the global backlight brightness value is located; determining, according to a correspondence between the backlight brightness interval and a backlight gain coefficient table, a backlight gain coefficient table corresponding to the backlight brightness interval, where the backlight gain coefficient table is configured to indicate a gain coefficient corresponding to a partition backlight brightness value; determining, according to a partition backlight brightness value of each of backlight partitions and the backlight gain coefficient table, a gain coefficient of each of the backlight partitions; and driving each of the backlight partitions according to the gain coefficient of each of the backlight partition and the partition backlight brightness value of each of the backlight partitions.

16 Claims, 9 Drawing Sheets

(52) U.S. Cl.
CPC ............ *G02F 2001/133601* (2013.01); *G09G 2310/0264* (2013.01); *G09G 2320/0233* (2013.01); *G09G 2320/064* (2013.01); *G09G 2320/0606* (2013.01); *G09G 2360/16* (2013.01)

(56) References Cited

U.S. PATENT DOCUMENTS

| | | | |
|---|---|---|---|
| 2015/0221284 A1* | 8/2015 | Zheng | H04N 5/235 345/589 |
| 2015/0379942 A1* | 12/2015 | Guo | G09G 3/3426 345/102 |
| 2016/0027354 A1* | 1/2016 | Terai | G09G 3/36 345/87 |
| 2017/0061897 A1* | 3/2017 | Zhang | G09G 3/3426 345/591 |
| 2017/0061901 A1* | 3/2017 | Zhang | G09G 3/3426 345/593 |
| 2017/0061902 A1* | 3/2017 | Zhang | G09G 3/3426 345/102 |
| 2017/0110064 A1* | 4/2017 | Zhang | G09G 3/3426 345/77 |

FOREIGN PATENT DOCUMENTS

| | | |
|---|---|---|
| CN | 105185353 A | 12/2015 |
| CN | 105321487 A | 2/2016 |
| JP | 2006-047594 A | 2/2006 |

\* cited by examiner

BACKLIGHT CONTROL METHOD AND DEVICE AND LIQUID CRYSTAL DISPLAY DEVICE

CROSS-REFERENCE TO RELATED APPLICATION

This application claims priority benefit of Chinese Patent Application No. 201710109740.2, filed on Feb. 28, 2017 and entitled "METHOD AND DEVICE FOR DETERMINING GAIN COEFFICIENT OF PARTITION BACKLIGHT AND LIQUID CRYSTAL DISPLAY DEVICE", which is hereby incorporated by reference in its entirety.

TECHNICAL FIELD

This disclosure relates to the technical field of liquid crystal display, and in particular, to a method and a device for determining a gain coefficient of partition backlight and a liquid crystal display device.

BACKGROUND

In order to improve the dynamic contrast and layering of the display, dynamic backlight modulation technology is usually used to control backlight brightness of liquid crystal display devices. Dynamic backlight modulation technology mainly includes global backlight modulation and partitioned backlight modulation. The global backlight modulation usually controls a backlight driver by a brightness control signal directly so as to drive all backlight sources to emit brightness corresponding to the brightness control signal. In order to protect the reliability of the backlight sources, maximum backlight brightness is usually controlled below a rated operating brightness. Partition backlight modulation is to divide the backlight matrix into a plurality of backlight partitions virtually, and the backlight driver can drive each of the backlight partitions. The backlight processor extracts a backlight brightness value of each of the backlight partitions according to a grayscale value of an image block corresponding to the backlight partition, and calculates an average backlight brightness value of the plurality of backlight partitions to determine an adjustment value and then adjusts the backlight brightness values of the partitions to determine target backlight brightness values. The target backlight brightness values are sent to the backlight driver through a brightness control signal to drive the backlight driver to provide the backlight needed by the respective backlight partitions.

SUMMARY

In a first aspect, a backlight control method is provided, including:

determining, based on a global backlight brightness value, a backlight brightness interval in which the global backlight brightness value is located;

determining, according to a correspondence between the backlight brightness interval and a backlight gain coefficient table, a backlight gain coefficient table corresponding to the backlight brightness interval, wherein the backlight gain coefficient table is configured to indicate a gain coefficient corresponding to a partition backlight brightness value;

determining, according to a partition backlight brightness value of each of backlight partitions and the backlight gain coefficient table, a gain coefficient of each of the backlight partitions; and driving each of the backlight partitions according to the gain coefficient of each of the backlight partition and the partition backlight brightness value of each of the backlight partitions.

In a second aspect, a backlight control device is provided, including:

a gain coefficient determination module, configured to:

determine, based on a global backlight brightness value, a backlight brightness interval in which the global backlight brightness value is located;

determine, according to a correspondence between the backlight brightness interval and a backlight gain coefficient table, a backlight gain coefficient table corresponding to the backlight brightness interval, wherein the backlight gain coefficient table is configured to indicate a gain coefficient corresponding to a partition backlight brightness value; and determine, according to a partition backlight brightness value of each of backlight partitions and the backlight gain coefficient table, a gain coefficient of each of the backlight partitions; and a target backlight value determination module, configured to drive each of the backlight partitions according to the gain coefficient of each of the backlight partition and the partition backlight brightness value of each of the backlight partitions.

In a third aspect, a liquid crystal display device is provided, including a backlight assembly, a liquid crystal panel, a backlight driver, a nonvolatile memory and a processor. The backlight assembly includes a backlight. The memory is configured to store instructions. The processor is coupled to the memory, and configured to execute the instructions stored in the memory. The processor is configured to determine, based on a global backlight brightness value, a backlight brightness interval in which the global backlight brightness value is located; determine, according to a correspondence between the backlight brightness interval and a backlight gain coefficient table, a backlight gain coefficient table corresponding to the backlight brightness interval, where the backlight gain coefficient table is configured to indicate a gain coefficient corresponding to a partition backlight brightness value; and determine, according to a partition backlight brightness value of each of backlight partitions and the backlight gain coefficient table, a gain coefficient of each of the backlight partitions; and determine, according to the gain coefficient of each of the backlight partitions and the partition backlight brightness value of each of the backlight partition, a target backlight brightness value of each of the backlight partitions. The backlight driver is configured to drive the backlight of each of the backlight partitions according to the target backlight brightness value of each of the backlight partitions.

In a fourth aspect, a backlight control device is provided, including a nonvolatile memory for storing instructions; a processor coupled to the memory, where the processor is configured to execute the instructions stored in the memory and the processor is configured to:

determine, based on a global backlight brightness value, a backlight brightness interval in which the global backlight brightness value is located;

determine, according to a correspondence between the backlight brightness interval and a backlight gain coefficient table, a backlight gain coefficient table corresponding to the backlight brightness interval, wherein the backlight gain coefficient table is configured to indicate a gain coefficient corresponding to a partition backlight brightness value;

determine, according to a partition backlight brightness value of each of backlight partitions and the backlight gain coefficient table, a gain coefficient of each of the backlight partitions; and drive each of the backlight partitions according to the gain coefficient of each of the backlight partition and the partition backlight brightness value of each of the backlight partitions.

BRIEF DESCRIPTION OF DRAWINGS

The accompanying drawings, which are incorporated in and constitute a part of this specification, illustrate embodiments which are consistent with the present disclosure and together with the description, serve to explain the principles of the disclosure.

To describe the technical solutions in the embodiments or in the prior art more clearly, the accompanying drawings required for describing the embodiments or the prior art are briefly introduced in the following. Apparently, the accompanying drawings in the following description merely show some embodiments of the present disclosure, and for those skilled in the art, other embodiments of the present disclosure may also be derived from these accompanying drawings without creative efforts.

DESCRIPTION OF EMBODIMENTS

To make the objectives, technical solutions, and advantages of the present disclosure more comprehensible, the technical solutions of the present disclosure are clearly and completely described in the following with reference to the accompanying drawings in the present disclosure. Apparently, the described embodiments are only some of the embodiments of the present disclosure, however not all of the embodiments. All other embodiments obtained by persons of ordinary skill in the art based on the embodiments in the present disclosure without creative efforts shall fall within the protection scope of the present disclosure.

It should be noted that all the embodiments in the present disclosure are described by taking an 8-bit ($2^8$=256 grayscale) liquid crystal display device as an example. However, the application of the technical solutions of the present disclosure is not limited to an 8-bit liquid crystal display device.

In this disclosure, a global backlight brightness value refers to an overall backlight brightness value of an image to be displayed, and a partition backlight brightness value of a partition is a backlight brightness value of partition. That is, the partition backlight brightness value of a partition is a backlight brightness value of the partition. The backlight brightness value and the partition backlight brightness value may be expressed in grayscale or other data formats.

Figure 1:
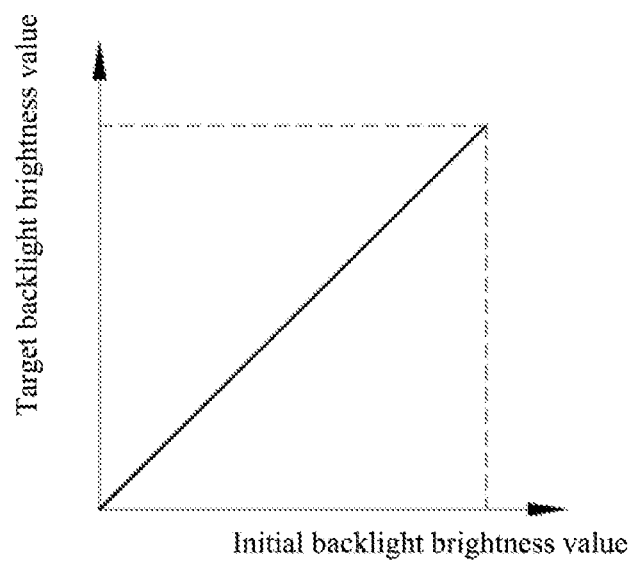
FIG. 1 is a schematic view of a variation relationship between backlight brightness and adjusted target backlight brightness in related art.

When implementing related art, the inventor found that: when the backlight brightness value for each of backlight partitions is adjusted by using the partition backlight modulation technology, the global backlight brightness value is only used for determining the basic duty ratio information. In the process of adjusting the brightness of the partitions, a backlight brightness adjustment value is determined according to a backlight brightness value of each of the backlight partitions, instead of the global backlight brightness value, and therefore backlight brightness values for the backlight partitions are adjusted in the same way or by the same scale coefficient under different global backlight brightness values and the backlight brightness values of the backlight partitions cannot be dynamically adjusted according to the global backlight brightness. Furthermore, the partition backlight modulation technology cannot output a backlight brightness value corresponding to the brightness characteristic of an image block, and thus the backlight brightness values corresponding to high and low grayscale image blocks are adjusted in the same way, thereby reducing the display contrast of the image and the layering of the screen quality. The variation relationship between the backlight brightness values of the backlight partitions and the adjusted target backlight brightness values is as shown in FIG. 1.

The inventor provides a backlight control method, a backlight control device and a liquid crystal display device in the present disclosure. A backlight brightness interval, where a global backlight brightness value is located, is determined based on the global backlight brightness value. A backlight gain coefficient table corresponding to the backlight brightness interval is determined according to a correspondence between the backlight brightness interval and the backlight gain coefficient table, where the backlight gain coefficient table is configured to indicate a gain coefficient corresponding to a partition backlight brightness value. A gain coefficient is determined for each of backlight partitions according to the partition backlight brightness value of that backlight partitions and the backlight gain coefficient table. Then each of the backlight partitions is driven according to the gain coefficient and the partition backlight brightness value of each of the backlight partitions. In this way, when the backlight brightness value of each of the backlight partitions is processed, an adjustment manner of the partition backlight brightness value corresponding to the global backlight brightness value is determined for each of the backlight partitions based on the global backlight brightness value for adjusting the image to be displayed. Thus, the determined and outputted partition backlight brightness values match the global backlight brightness, so that the contrast and layering of the displayed image can be improved.

Figure 2A:
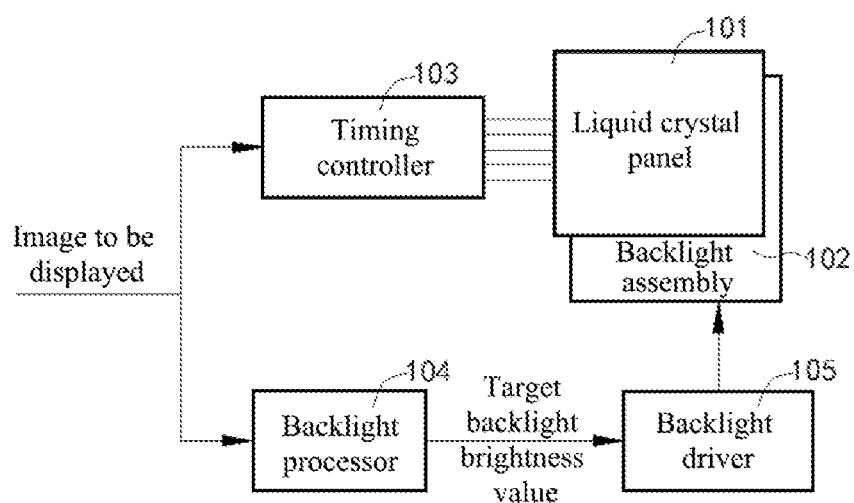
FIG. 2A is a schematic structural view of a liquid crystal display system according to some embodiments.

FIG. 2A is a schematic structural view of a liquid crystal display system according to some embodiments of the present disclosure. As shown in FIG. 2A, a liquid crystal display system includes a liquid crystal panel 101, a backlight assembly 102, a timing controller 103, a backlight processor 104 and a backlight driver 105. The backlight assembly 102 provides a desired backlight for the liquid crystal panel 101.

When an image to be displayed is received, the backlight processor 104 determines the target backlight brightness values of the backlight partitions according to the grayscale values of pixels in the image to be displayed, and sends the target backlight brightness values to the backlight driver 105. The backlight driver 105 generates a control signal for controlling the partition backlight brightness values of backlight partitions according to the received target backlight brightness values of the backlight partitions. At the same time, the timing controller 103 sends the image to be displayed to the liquid crystal panel 101 according to preset timing. When the liquid crystal panel 101 displays the image to be displayed, the backlight assembly 102 provides backlight for each partition according to the brightness control signal, so as to achieve the adjustment for the display effect of the image. For the present disclosure, The system architecture as shown in FIG. 2 and the gain coefficient determining method for controlling the gain of the partition backlight brightness value executed during operation of the system structure may reflect the inventor's contribution to the improvement of the technology.

In the following, the technical solutions provided by the present disclosure are described in detail by using some embodiments. It should be noted that, the following embodiments may be combined with each other, and the same or similar concepts or processes may not be described in detail in some embodiments.

Figure 2B:
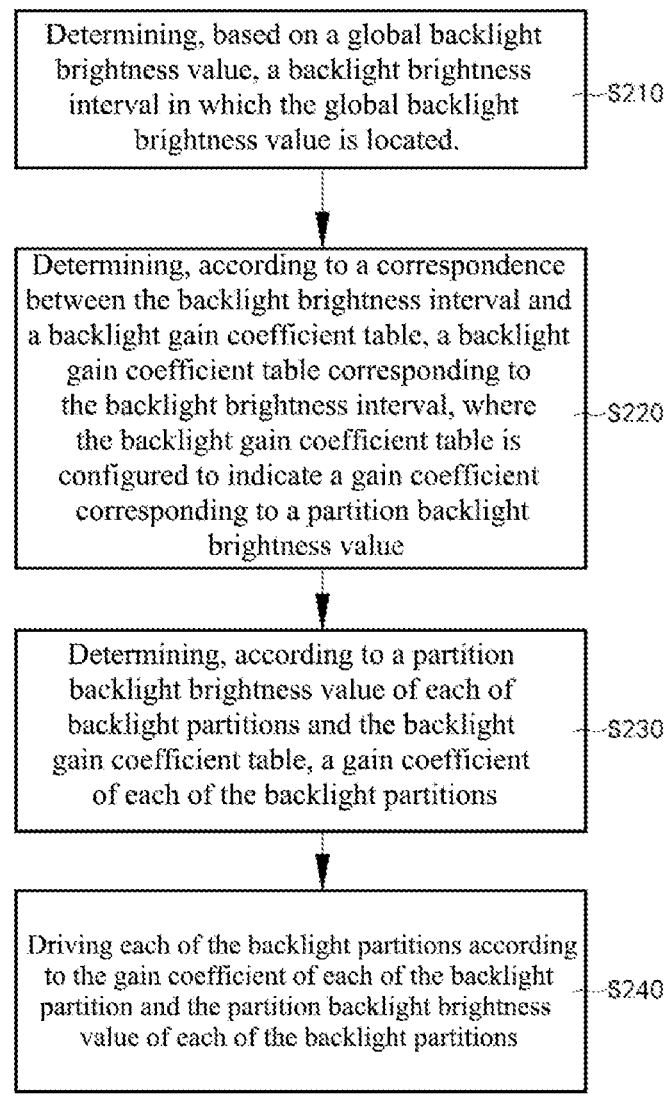
FIG. 2B is a schematic flowchart of a method provided in some embodiments.

In some embodiments, a method for controlling backlight is provided. FIG. 2B is a schematic flowchart of a method provided in the embodiments. An execution entity of the method may be a backlight processor, where the backlight processor may be disposed inside the liquid crystal display device and implemented by software and/or hardware.

In some embodiments of the present disclosure, when a liquid crystal display device displays each frame of image, the backlight processor needs to determine a target backlight brightness value of each of backlight partitions for each frame of image using the control method as shown in FIG. 2B. The process for the backlight processor to determine the target backlight brightness value of each of the backlight partitions corresponding to each frame of image is the same. In the following, the method as shown in FIG. 2B is described in detail by taking the process of the backlight processor determining the target backlight brightness value of each of the backlight partitions corresponding to any frame of image to be displayed. Please refer to FIG. 2B, the method includes:

Step S210, determining, based on a global backlight brightness value, a backlight brightness interval in which the global backlight brightness value is located.

The global backlight brightness value is a backlight brightness value determined based on a grayscale brightness value of one or more frames of image to be displayed. Alternatively, the backlight brightness value may be determined by a user input or a preset correspondence table, where the preset correspondence table includes a mapping relationship between the user input and the global backlight brightness value.

The global backlight brightness value may be sent from a SoC (system on chip) to the backlight processor by means of a Pulse Width Modulation (PWM) signal. A driving signal from the backlight driver can drive the backlight light source to emit backlight brightness corresponding to the global backlight brightness value.

It should be noted that the global backlight value for adjusting the global backlight brightness value of screen may also be sent to the backlight processor in other forms, which is not specifically limited in the present disclosure.

The global backlight brightness value is determined by the grayscale brightness value of one or more frames of image to be displayed. For example, the global backlight brightness value is determined by using an average grayscale brightness value or a weighted average brightness value of the grayscale brightness value of one or more frames of image to be displayed.

As another implementation, a global backlight brightness value may be adjusted based on a user input to meet requirements for different viewing scenarios.

A user may adjust the global backlight brightness value by selecting a viewing mode. According to usage requirements of the user in different viewing scenarios, global backlight brightness values corresponding to different viewing modes (i.e., a preset correspondence table) are preset. When the user selects a viewing mode according to a viewing demand, a global backlight brightness value corresponding to the selected viewing mode is determined, so as to adjust the global backlight of the screen to meet the viewing requirement of the user in the scenario.

For example, viewing modes such as "standard", "movie" and "game" each with different global backlight brightness may be preset according to user's viewing requirements in different scenarios. For each viewing mode, a PWM signal value is set for adjusting corresponding backlight brightness, and the PWM signal value may be stored in a main control chip SoC. In order to highlight the color display effect of the display screen in the "game" mode, it is required to provide higher backlight brightness. Therefore, the PWM signal value used for adjusting global image brightness in the "game" mode may be set as 90%. In order to enhance the viewing environment of a movie in the "movie" mode, lower backlight brightness may be needed and thus the PWM signal value for adjusting the global image brightness in "movie" mode may be set to 20%. In order to meet user's needs of normal viewing, the PWM signal value may be set as 50% to adjust the global image brightness in "standard" mode. A user can select a desired viewing mode according to individual requirements through a remote control or physical buttons on a liquid crystal display device. According to the PWM signal corresponding to the different viewing mode selected by the user, the global backlight brightness value may be determined, and the global backlight brightness of the screen may be adjusted to meet the viewing needs of the user.

It should be noted that the user may also adjust the global backlight brightness value in other manners so that the display screen displays the backlight brightness required by the user for viewing, which is not limited herein. The embodiments of the present disclosure provide a method for determining a gain coefficient to adjust a backlight brightness value of a backlight partition according to a global backlight brightness value. Other adjustment manners with respect to the global backlight brightness value conceived by a person skilled in the art according to the technical solutions of the present disclosure and the inventive concept without any creative efforts also fall within the protection scope of the present disclosure.

In the present disclosure, a global backlight brightness value range may be divided into a plurality of intervals by presetting one or more threshold values. Using endpoint values of these intervals as threshold values and comparing a received global backlight brightness value with each threshold value. A backlight brightness interval is an interval indicated by two adjacent threshold values containing the global backlight brightness value.

Taking a PWM signal corresponding to a global backlight brightness value as an example, by presetting at least one threshold value, a plurality of backlight brightness intervals are obtained between the minimum value and the maximum value of available PWM signals. As an available PWM signal range is 0-100%, for example, a preset threshold value of 50% divides the entire range of 0-100% of the global backlight brightness value into two backlight brightness intervals. To facilitate the explanation of these embodiments, a range where the PWM signal is 0-50% is defined as a low backlight brightness interval according to the value of the PWM signal in the backlight brightness intervals, a range where the PWM signal is 50%-100% is defined as a high backlight brightness interval, and the PWM signal of 50% belongs to the high backlight brightness interval. Alternatively, a range where the PWM signal is 0-30% is defined as a low backlight brightness interval, a range where the PWM signal is 30%-60% is defined as a middle backlight brightness interval, and a range where the PWM signal is 60%-100% is defined as a high backlight brightness interval.

In some embodiments, division of the backlight brightness intervals may also be performed according to the brightness of the global backlight brightness value. For example, a range having a grayscale of 155 or less is a low backlight brightness interval, a range having a grayscale greater than 155 is a high backlight brightness interval; alternatively, a range having a grayscale of 130 or less is a low backlight brightness interval, a range having a grayscale between 130-180 is a middle backlight brightness interval, and a range having a grayscale greater than 180 is a high backlight brightness interval.

It should be noted that, in the embodiments, different threshold values may be set to indicate multiple backlight brightness intervals by using other methods or according to actual needs, which is not specifically limited herein.

Step S220, determining, according to a correspondence between the backlight brightness interval and a backlight gain coefficient table, a backlight gain coefficient table corresponding to the backlight brightness interval, where the backlight gain coefficient table is configured to indicate a gain coefficient corresponding to a partition backlight brightness value.

In some embodiments, for each of backlight brightness intervals, a corresponding backlight gain coefficient table is determined according to a preset mapping relationship, and different backlight intervals correspond to different backlight gain coefficient tables respectively, so that, for each of the backlight partitions, different backlight adjustment methods can be adopted according to global backlight brightness values in different backlight brightness intervals. Different backlight intervals correspond to different backlight gain coefficient tables, which means that a same partition brightness value corresponds to different gain coefficients in different backlight gain coefficient tables.

It should be noted that the preset mapping relationships between the backlight brightness intervals and the backlight gain coefficient tables are in a one-to-one correspondence. After determining the backlight brightness interval in which the global backlight brightness value is located, the backlight gain coefficient table corresponding to the global backlight brightness value is correspondingly determined, and each of the backlight brightness intervals is configured with a different backlight gain coefficient table. The backlight brightness of each partition is adjusted by using the determined backlight gain coefficient table, so that the global backlight brightness value can be combined with the backlight brightness adjustment method of each partition.

In other embodiments, a backlight gain coefficient table includes a relationship between backlight brightness values within its corresponding backlight brightness interval and their respective gain coefficients. For a threshold position of two backlight brightness intervals, its gain coefficient in the coefficient table corresponding the lower backlight brightness interval is smaller than its gain coefficient in the coefficient table corresponding to the higher backlight brightness interval. For example, a PWM signal less than 50% corresponds to the low backlight brightness interval, and a PWM signal greater than or equal to 50% corresponds to the high backlight brightness interval, and then when the PWM signal in the low backlight brightness interval approximates 50% infinitely, its gain coefficient value in the backlight gain coefficient table corresponding to the low backlight brightness interval is less than the gain coefficient value of a PWM signal of 50%, which is in the high backlight range, in the backlight gain coefficient table corresponding to the high backlight brightness interval.

Step S230, determining, according to a partition backlight brightness value of each of backlight partitions and the backlight gain coefficient table, a gain coefficient of each of the backlight partitions.

In some embodiments, a gain coefficient table is used to characterize a correspondence between a partition backlight brightness value and a gain coefficient, and each of the backlight gain coefficient tables can be expressed as a gain curve. On the gain curve correspondingly indicated by the backlight gain coefficient table, the partition backlight brightness values correspond to their respective gain coefficients. The expression forms of the backlight gain coefficients are not limited to gain curves, and not limited herein. In this embodiment, the gain curve is taken as an example for illustration.

It should be noted that, in order to achieve adjusting partition backlight brightness values for a low grayscale image block and a high grayscale image block of backlight partitions in different ways so as to enhance the contrast of the display screen, in the gain curve indicated by the backlight gain coefficient table, the gain coefficient increases first and then decreases with an increase of the partition backlight brightness value, so that the backlight gain coefficient value corresponding to the low grayscale image block is different from the backlight gain coefficient value corresponding to the high grayscale image block. Therefore the backlight partition with the low grayscale image and the backlight partition with the high grayscale image are respectively adjusted according to their respective gain coefficients.

In some embodiments, gain coefficients of each gain curve are all greater than 1, so that the adjusted partition backlight brightness value is increased compared with the previous value so as to improve image display quality.

Meanwhile, the differences of the partition backlight brightness values are increased, so that the contrast of the display screen is further improved.

Figure 2C:
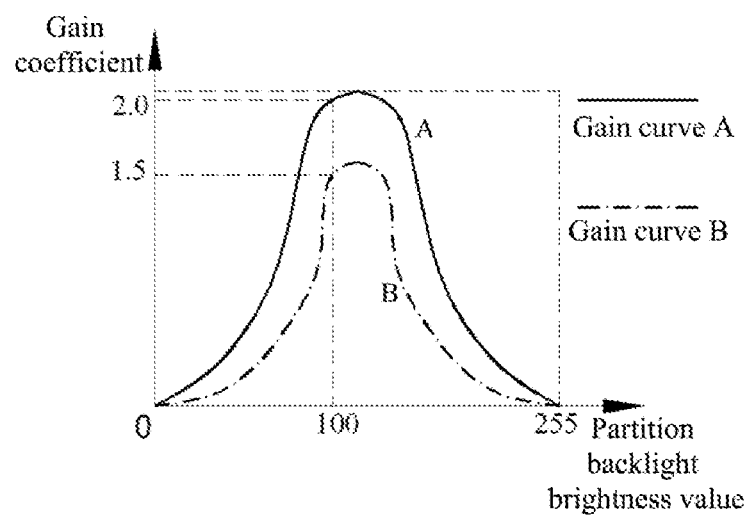
FIG. 2C is a schematic view of a gain curve provided in some embodiments.

In some embodiments, a threshold value of 50% is set within a PWM signal value range of the global backlight brightness value, and the range of the PWM signal is then divided into two backlight brightness intervals, i.e., 0-50% of a low brightness backlight brightness interval and 50%-100% of a high brightness backlight brightness interval. As shown in FIG. 2C, the preset curve A is a gain curve corresponding to the high backlight brightness interval, and the curve B is a gain curve corresponding to the low backlight brightness interval. In the diagram of gain curves A and B, a horizontal axis is used to indicate a partition backlight brightness value in the range of 0-255 and a vertical axis is for the gain coefficient. With the increase of the partition backlight brightness value, the gain coefficients of curves A and B first increases and then decreases. For a same partition backlight brightness value, its corresponding gain coefficient on the gain curve A is greater than its corresponding gain coefficient on the gain curve B. As can be seen from FIG. 2C, the gain curve A is located above the gain curve B, so that, for a same partition backlight brightness value, the amplitude of its corresponding gain coefficient for the high brightness backlight brightness interval is greater than that for the low brightness backlight brightness interval. In some embodiments, the gain curve A and B may be different gamma curves. The gain coefficient table can be a corresponding function curve or a relation mapping table.

There may be two scenarios for the partition backlight brightness value ranges of multiple gain coefficient tables:

1, the partition backlight brightness value range for each of the gain coefficient tables covers the entire range (0-255), as shown in FIG. 2C.

2, the partition backlight brightness value range for each of the gain coefficient tables only covers a portion of the entire range. For example, the partition backlight brightness value range for the gain coefficient table is the same as the corresponding backlight brightness interval. In this case, the partition backlight brightness value ranges for the gain coefficient tables corresponding to adjacent backlight brightness intervals do not overlap with each other. Alternatively, partition backlight brightness value ranges for the gain coefficient tables may be greater than the corresponding backlight brightness interval. In this case, the partition backlight brightness value ranges for the gain coefficient tables corresponding to adjacent backlight brightness intervals have an overlapped portion.

Figure 6:
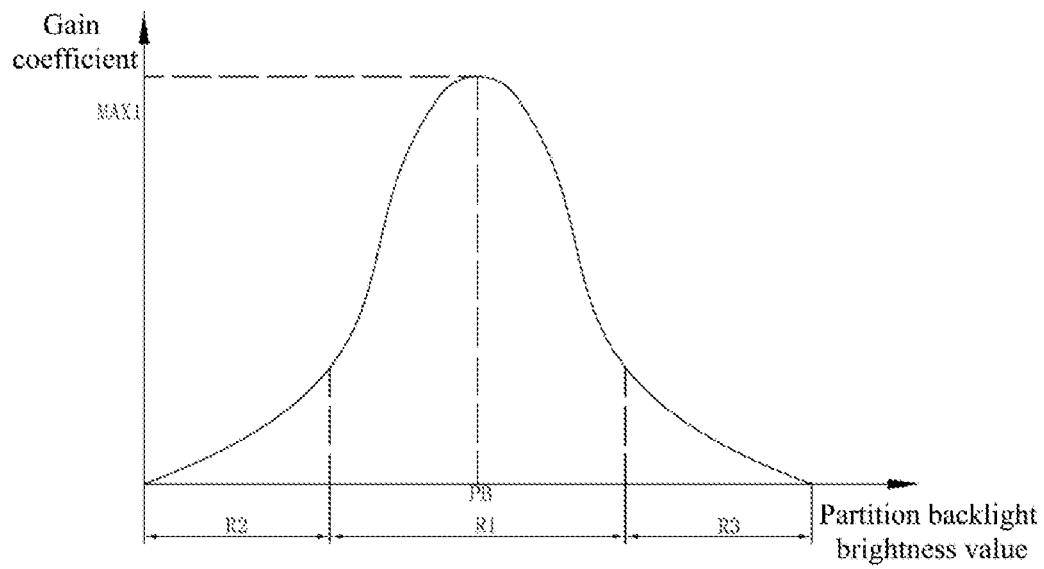
FIG. 6 is a schematic view of a gain curve provided in some embodiments.

When the partition backlight brightness value range for the gain coefficient table only includes a portion of the entire range, the corresponding gain curve is also a part of the complete gain curve. As shown in FIG. 6, when the partition backlight brightness value is PB, the corresponding gain coefficient on the gain curve is the maximum MAXI. When the partition backlight brightness value range is R2, the maximum of the value range is smaller than PB, and then the gain coefficient increases with the increase of the partition backlight brightness value. When the partition backlight brightness value range is R1 containing PB, the gain coefficient increases with the increase of partitioned backlight brightness before reaching MAX1 and then decreases. When the partition backlight brightness value range is R3, the minimum partition backlight brightness value is greater than PB, and the gain coefficient decreases with the increase of partition backlight brightness value.

Figure 7:
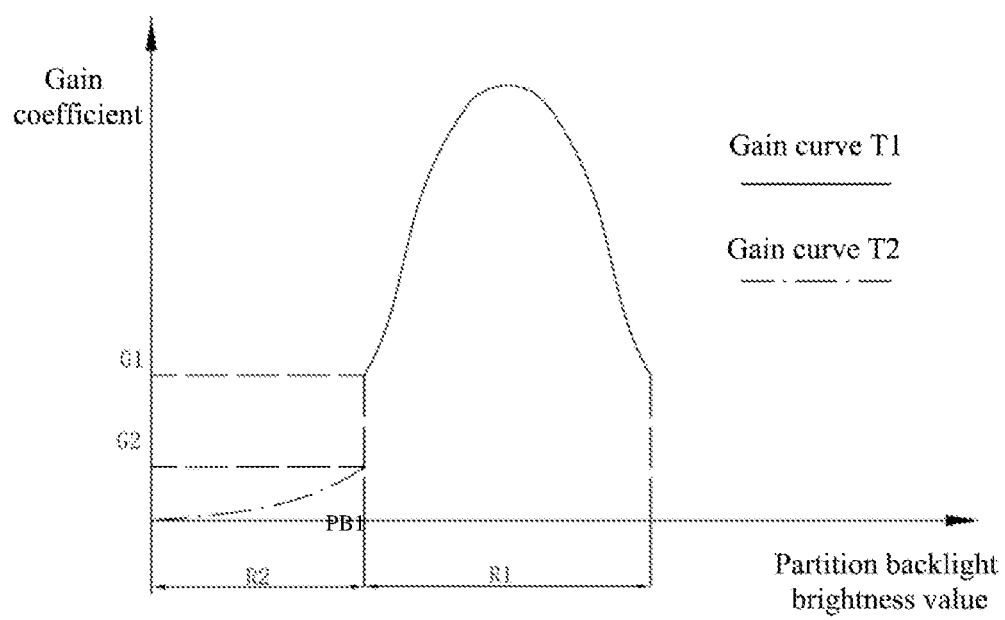
FIG. 7 is a schematic view of gain curves provided in some embodiments.

FIG. 7 is a schematic view of a gain curve provided in some embodiments. A global backlight brightness value GB1 is located in the backlight interval R1 which corresponds to a gain curve T1, and a partition backlight brightness value PB1 corresponds to a gain coefficient G1 on the gain curve T1. A global backlight brightness value GB2 (<GB1) is located in a backlight interval R2 corresponding to a gain curve T2, and the partition backlight brightness value PB1 corresponds to the gain coefficient G2 on the gain curve T2. In this embodiment, the range on the horizontal axis for the gain curve T1 is R1, the range on the horizontal axis for the gain curve T2 is R2, and R1 and R2 are adjacent to each other without overlap, i.e., the partition backlight brightness value range of the gain curve corresponding to the backlight brightness interval is the same as the corresponding backlight brightness interval range. In this case, the gain coefficient G2 corresponding to the maximum value of the range R2 is smaller than the gain coefficient G1 corresponding to the maximum value of the range R1.

Figure 8:
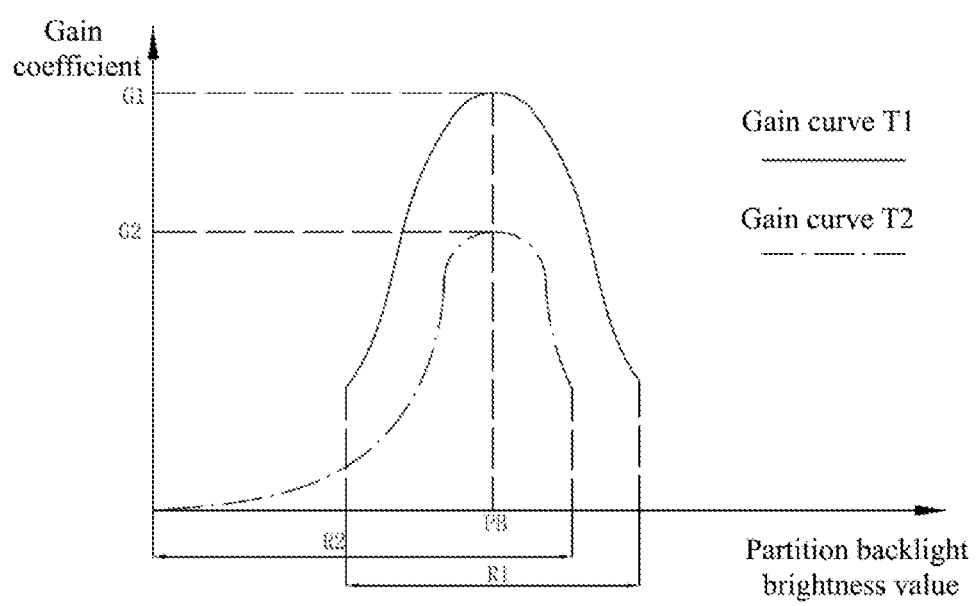
FIG. 8 is a schematic view of gain curves provided in some embodiments.

FIG. 8 is a schematic diagram view of a gain curve provided in some embodiments. Gain curve T1 corresponds to a higher backlight brightness interval than gain curve T2. Partition backlight brightness value ranges R1 and R2 of the gain curves T1 and T2 partially overlap with each other. In the overlapped portion, the gain curve T1 is always above the gain curve T2, and a gain coefficient G1 corresponding to the partition backlight brightness value PB on the gain curve T1 is greater than a gain coefficient G2 corresponding to PB on the gain curve T2.

In some embodinents, when a user selects a "game" mode to adjust the global backlight of the screen, the PWM signal received for adjusting the global backlight brightness value has a value of 90%. After comparing with the set threshold 50%, it is determined that the PWM signal belongs to the high backlight brightness interval which corresponds to the gain curve A as shown in FIG. 2C. The gain coefficient corresponding to each of the backlight partitions in the "game" mode is determined according to gain curve A. For example, if the backlight brightness value of the backlight partition 1 is 100, it is determined that the gain coefficient corresponding to the partition backlight brightness value 100 on the gain curve A is 2. If the user selects the "movie" mode to adjust the global backlight of the screen, the PWM signal received for adjusting the global backlight brightness value is 20%. After comparing with the set threshold 50%, it is determined that the PWM signal belongs to the low backlight brightness interval. According to the gain curve B corresponding to the low brightness backlight brightness interval, the gain coefficient corresponding to each of the backlight partitions in "movie" mode is determined. For example, as shown in FIG. 2C, the backlight brightness value of the backlight partition 2 is 100, and it is determined that the gain coefficient corresponding to the partition backlight brightness value 100 on the gain curve B is 1.5.

It should be noted that, the backlight brightness value of a low grayscale image block is small. In order to prevent that the backlight of the low grayscale image block is too bright, which will cause the dark field details of the image cannot be displayed normally, the preset gain coefficient is small when the backlight brightness value is low, so that the adjusted gain value of the partition backlight brightness value is small. With the gradual increase of the partition backlight brightness value, the grayscale value of the image block corresponding to the backlight partition also gradually increases. In order to highlight the details of that part of image and improve the display contrast with respect to the low grayscale image block, the preset gain coefficient also gradually increases, so that the gain value of the adjusted backlight brightness value is larger. As for a high grayscale image block, since its initial backlight brightness is large enough, the peak brightness of the image content is high and it has less details, then a bright screen can be displayed without a large backlight gain. Therefore, when the partition backlight brightness value continues to increase, the preset gain coefficient is gradually decreased, so that the gain value of the adjusted partition backlight brightness is relatively small Therefore, in the preset backlight gain coefficient table, the gain coefficient increases first and then decreases with the increase of the partition backlight brightness value.

It should be further explained that in some embodiments, a backlight brightness value of a backlight partitions is obtained by extracting, from an image to be displayed, a grayscale brightness value of an image block corresponding to that backlight partition. And further, based on an average value or a weighted average value of the extracted grayscale brightness values of the respective image blocks, a global backlight brightness value is determined. The method for determining a backlight brightness value of a backlight partition will be explained in the following.

In some embodiments, in a liquid crystal display device, a backlight matrix is virtually divided into a plurality of backlight partitions in a row direction and a column direction, respectively, according to a preset rule. Each of the divided backlight partitions can be individually provided with a backlight by its corresponding backlight source. A received image to be displayed includes a plurality of image blocks, and the image blocks corresponding to the backlight partitions are determined according to the sizes of the backlight partitions and positions of the backlight partitions in the backlight assembly. That is, one backlight partition corresponds to one image block, or one image block corresponds to a plurality of backlight partitions.

Figure 2D:
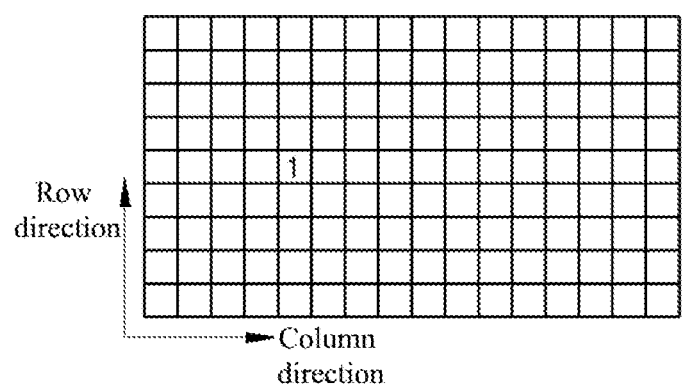
FIG. 2D is a schematic diagram of dividing backlight partitions in some embodiments.

For example, as shown in FIG. 2D, the backlight source matrix is divided into 9 partitions along a row direction and 16 partitions along a column direction according to a preset rule, and correspondingly, an image to be displayed are divided into 16*9 image blocks according to the same preset rule. And according to the row and column in which a backlight partition is located and the row and column in which the image block is located, the backlight partitions and the image blocks are in one-to-one correspondence. For example, the backlight partition of the $N^{th}$ row, the $M^{th}$ column corresponds to the image block of the $N^{th}$ row, $M^{th}$ column.

After determining each of the backlight partitions and its corresponding image block, the grayscale value of the image block corresponding to the backlight partition is extracted from the image to be displayed as the backlight brightness value of the backlight partition. Optionally, the backlight brightness value of the backlight partition may be determined according to an average value of the grayscale values of the pixels in the image block, or the backlight brightness value of the backlight partition may be determined according to a weighted value of the grayscale values of the pixels in the image block. In practical applications, the backlight brightness value of each of the backlight partitions may also be determined by other manners, which is not specifically limited in the present disclosure.

In an example, it is assumed that an image block 1 corresponding to the backlight partition 1 includes 5*5 pixels, and the grayscale values of the pixels in the image block 1 are as shown in Table 1:

TABLE 1

| 120 | 130 | 125 | 145 | 200 |
|-----|-----|-----|-----|-----|
| 220 | 200 | 125 | 130 | 145 |
| 145 | 120 | 130 | 125 | 145 |
| 145 | 200 | 130 | 125 | 145 |
| 200 | 130 | 125 | 210 | 220 |

An average value of the grayscale values of the pixels shown in Table 1 is determined as 145, and the average value 145 is an initial backlight brightness value of the backlight partition 1. First, the grayscale value of the image block corresponding to the backlight partition is determined, and then the initial backlight brightness value of the backlight partition is determined according to the grayscale value of the image block, and the initial backlight brightness value is proportional to the grayscale value of the image block. In this way, it can be ensured that the backlight brightness value of each of the backlight partitions can be matched with the image to be displayed, so as to improve the image display effect.

Step S240, driving each of the backlight partitions according to the gain coefficient of each of the backlight partition and the partition backlight brightness value of each of the backlight partitions.

In some embodiments, after determining a gain coefficient, a backlight of each of backlight partitions may be driven according to the partition backlight brightness value and the gain coefficient of each of the backlight partitions, so as to provide a required backlight.

Figure 2E:
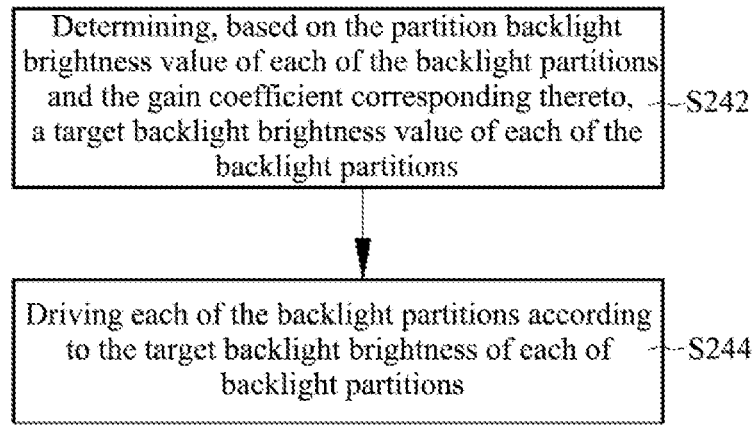
FIG. 2E is a schematic flowchart of a method provided in some embodiments.

It should be further noted that, referring to FIG. 2E, in some embodiments, step S240 may include:

Step S242: determining, based on the partition backlight brightness value of each of the backlight partitions and the gain coefficient corresponding thereto, a target backlight brightness value of each of the backlight partitions; and, Step S244, driving each of the backlight partitions according to the target backlight brightness of each of backlight partitions.

Optionally, in some embodiments, a product of the backlight brightness value of the backlight partition and the corresponding gain coefficient may be determined as the target backlight brightness value of the backlight partition.

In some embodiments, according to a PWM signal for adjusting the global brightness of the screen, the partition backlight brightness value of the backlight partition 1 is determined as 100. In step S230, the gain curve A as shown in FIG. 2C is used to determine that the gain coefficient corresponding to the backlight brightness value 100 of the backlight partition 1 is 2. The product 200 of the partition backlight brightness value 100 and the gain coefficient 2 is the target backlight brightness value of the backlight partition 1.

In some embodiments, according to the backlight brightness interval where the PWM signal is located, it is determined to use a gain curve A or B to adjust the backlight brightness value of each of backlight partitions.

Figure 2F:
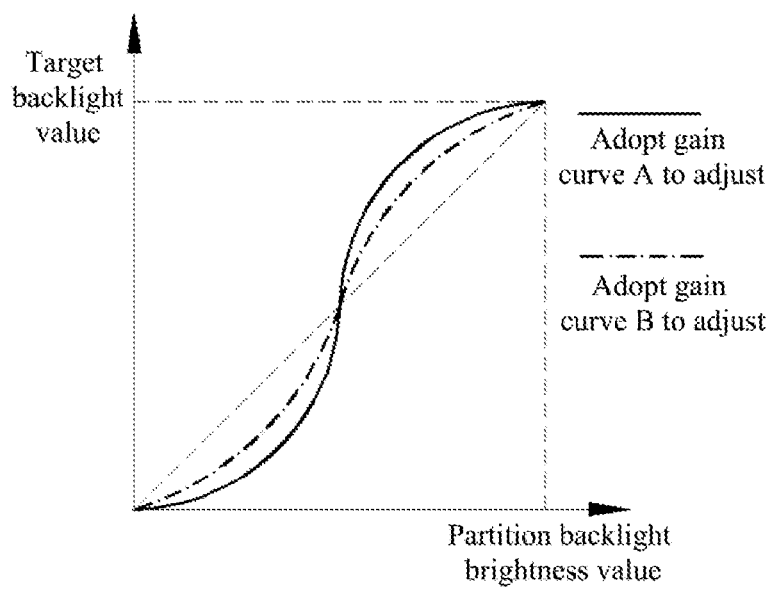
FIG. 2F is a schematic view of a variation relationship between a partition backlight brightness value and an adjusted target backlight brightness value in some embodiments.

The relationship between the backlight brightness value of each of the backlight partitions and the adjusted target backlight brightness value is as shown in FIG. 2F. The target backlight brightness value of each of the backlight partitions is adjusted and outputted according to the gain coefficient corresponding to the backlight brightness value on the gain curve A or B, so that the partition backlight brightness values corresponding to different grayscale image blocks of the image to be displayed are adjusted by different factors. The target backlight brightness of the low grayscale image blocks is low and changes slowly. With the gradual increase of the backlight brightness value, the grayscale value of the image block also gradually increases, the corresponding target backlight brightness value is larger and the growth rate is relatively high. When the partition backlight brightness value gradually increases to near the maximum, the growth rate decreases, and then levels off. As the gain coefficient of the gain curve A is larger than the gain coefficient in gain curve B, when the partition backlight brightness value is adjusted by using the gain curve A, the gain coefficient is greater than the one when the gain curve B is used to adjust the partition backlight brightness value, thereby highlighting the difference between the bright image and the dark image and improving the display contrast of the image.

It should be noted that in this embodiment, the target backlight brightness value of each partition is determined by the product of the backlight brightness value of each of backlight partitions and the corresponding gain coefficient, so as to ensure that the adjusted target backlight brightness value should not be too large. Therefore, the liquid crystal display device can adjust the backlight brightness value of each of the backlight partitions respectively according to the global backlight brightness value of the image to be displayed on the basis of the existing hardware. In this embodiment, the target backlight brightness value may also be determined by other manners or according to actual needs according to the gain coefficient determined, which is not specifically limited herein.

In some embodiments, after a target backlight brightness value of each of backlight partitions is determined, the target backlight brightness value corresponding to each of the backlight partitions may further be sent to a driving circuit corresponding to each of the backlight partitions. So that the corresponding driving circuit adjusts the backlight brightness of the backlight partition according to the target backlight brightness value. In some embodiments, the backlight brightness of the backlight partition can be adjusted by the driving circuit as shown in FIG. 2G.

Figure 2G:
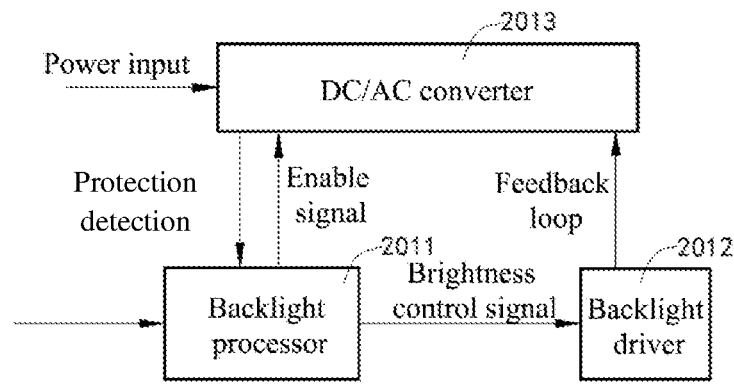
FIG. 2G is a schematic structural view of a backlight driving circuit in some embodiments.

FIG. 2G is a schematic structural view of a backlight driving circuit according to some embodiments of the present disclosure. Referring to FIG. 2G, after a backlight processor 2011 determines the target backlight brightness value according to the method described above, it processes the target backlight brightness value to obtain a brightness control signal and sends the brightness control signal to a backlight driver 2012, so that the backlight driver 2012 controls the turn-on of the MOS transistor connected to LED string lights according to the control signal, thereby controlling the actual backlight unit to generate the brightness corresponding to the backlight data. Optionally, the control signal may be a PWM signal or a current signal.

A DC/AC converter 2013 is configured to convert a voltage input from a power supply to a voltage required by the LED string lights, and further configured to maintain a stable voltage through the feedback of the feedback loop. The backlight processor 2011 may also send an enable signal to the DC/AC converter 2013 after starting to operate, so that the DC/AC converter 2013 begins to perform the protection detection on the backlight processor 2011 to avoid over-voltage or over-current.

The embodiments of the present disclosure provide a method for controlling backlight including: determining, based on a global backlight brightness value, a backlight brightness interval in which the global backlight brightness value is located; determining, according to a correspondence between the backlight brightness interval and a backlight gain coefficient table, a backlight gain coefficient table corresponding to the backlight brightness interval, where the backlight gain coefficient table is configured to indicate a gain coefficient corresponding to a partition backlight brightness value; determining, according to a partition backlight brightness value of each of backlight partitions and the backlight gain coefficient table, a gain coefficient of each of the backlight partitions; and driving each of the backlight partitions according to the gain coefficient of each of the backlight partition and the partition backlight brightness value of each of the backlight partitions. In this way, when the backlight brightness values of the backlight partitions are adjusted, the gain coefficient of each of backlight partitions is determined according to the global backlight brightness value for adjusting the brightness of the global screen backlight, and the backlight brightness value of each partition is adjusted with reference to the global backlight brightness value. Therefore, each of the backlight partitions is adjusted according to the adjustment manner corresponding to the global backlight brightness value of the current image, and the target backlight brightness is determined which matches the brightness of the global backlight, thereby improving the contrast and layering of the screen display and meeting the viewing needs of the user.

Figure 3:
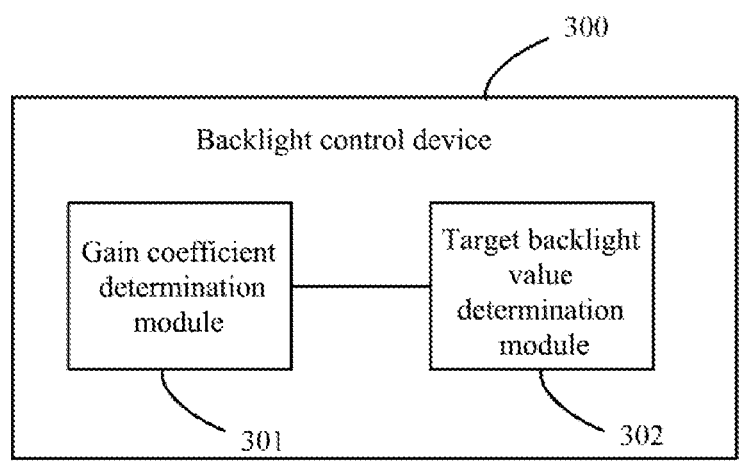
FIG. 3 is a schematic structural view of a device provided in some other embodiments.

FIG. 3 is a schematic structural view of a backlight control device 300, according to some other embodiments of the present disclosure. Referring to FIG. 3, the device 300 includes a gain coefficient determination module 301 and a target backlight value determination module 302.

The gain coefficient determination module 301 is configured to determine, based on a global backlight brightness value, a backlight brightness interval in which the global backlight brightness value is located; determine, according to a correspondence between the backlight brightness interval and a backlight gain coefficient table, a backlight gain coefficient table corresponding to the backlight brightness interval, where the backlight gain coefficient table is configured to indicate a gain coefficient corresponding to a partition backlight brightness value; and determine, according to a partition backlight brightness value of each of backlight partitions and the backlight gain coefficient table, a gain coefficient of each of the backlight partitions.

The target backlight value determination module 302 is configured to determine a target backlight brightness value of each of the backlight partitions according to the gain coefficient of each of the backlight partitions and the partition backlight brightness value of each of the backlight partitions. In some embodiments, the target backlight value determination module 302 further determines a brightness control signal of each of the backlight partitions according to the target partition backlight brightness value of each of the backlight partitions.

The device 300 in this embodiment may be configured to execute the technical solutions of the backlight control method provided in the foregoing disclosure of the present disclosure. Implementation principles and technical effects of them are similar, and details are not repeated herein.

Figure 4:
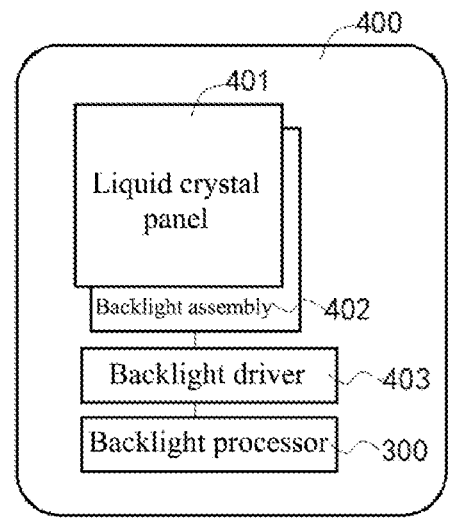
FIG. 4 is a schematic structural view of a liquid crystal display device according to further embodiments.

FIG. 4 is a schematic structural view of a liquid crystal display device provided by some embodiments. Referring to FIG. 4, a liquid crystal display device 400 includes a liquid crystal panel 401, a backlight assembly 402, a backlight driver 403, and a backlight processor 300.

The backlight assembly 402 includes backlight resources (not shown) that provides desired backlight for each of backlight partitions.

The backlight processor 300 is configured to determine, based on a global backlight brightness value, a backlight brightness interval in which the global backlight brightness value is located; determine, according to a correspondence between the backlight brightness interval and a backlight gain coefficient table, a backlight gain coefficient table corresponding to the backlight brightness interval; determine, according to a partition backlight brightness value of each of the backlight partitions and the gain coefficient table, a gain coefficient of each of the backlight partitions; and determine, according to the partition backlight brightness value of each of the backlight partitions and the gain coefficient, a target backlight brightness value for controlling each of the backlight partitions.

The backlight driver 403 is configured to drive the backlight source of each of the backlight partitions according to the target backlight brightness value of each of the backlight partitions. The backlight driver 403 generates, according to the target backlight brightness value of each of the backlight partitions, a brightness control signal for controlling the backlight source of each of the backlight partitions, and outputs it to the backlight assembly 402 to drive the backlight source of each of the backlight partitions to provide a required backlight for each of the backlight partitions, thereby achieving the adjustment of the display effect of the image.

In some embodiments, the backlight processor 300 may determine the brightness control signal of each of backlight partitions according to the target partition backlight brightness value of each of the backlight partitions, and output the brightness control signal of each of the backlight partitions to the backlight driver 403. In this way, signal calculation processing can be centralized to the backlight processor 300 to simplify the structure of the backlight driver 403.

The principles and the technical effects of determining the gain coefficient in these device embodiments are similar to those in the foregoing method embodiments, and the details are not repeated herein.

Figure 5:
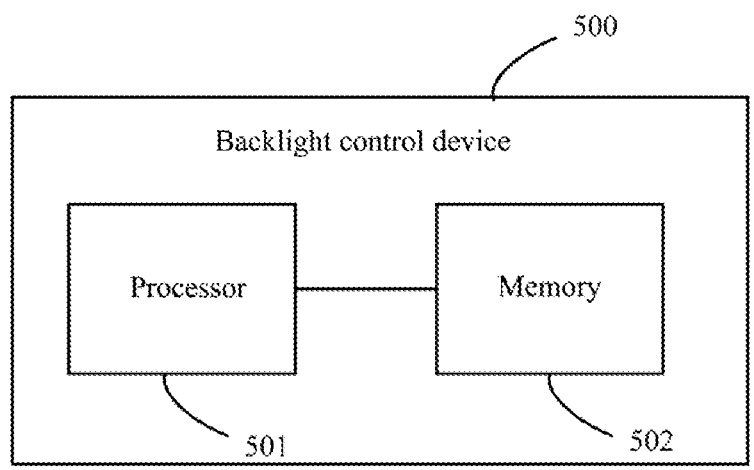
FIG. 5 is a structural diagram view of a gain coefficient determination device for controlling a brightness gain of partition backlight according to further embodiments.

FIG. 5 is a structural diagram view of a backlight control device for controlling a partition backlight brightness gain according to some further embodiments. The device may include a memory 501 and a processor 502. The memory 501 is configured to store instructions, and may be implemented by any type of volatile or nonvolatile memory devices or a combination thereof. The processor 502 is coupled to the memory 501 and configured to execute the instructions stored in the memory. The processor 502 may be configured to determine, based on a global backlight brightness value, a backlight brightness interval in which the global backlight brightness value is located. The processor 502 may further be configured to determine, according to a correspondence between the backlight brightness interval and a backlight gain coefficient table, a backlight gain coefficient table corresponding to the backlight brightness interval, where the backlight gain coefficient table is configured to indicate a gain coefficient corresponding to a partition backlight brightness value. The processor 502 may further be configured to determine, according to a partition backlight brightness value of each of backlight partitions and the backlight gain coefficient table, a gain coefficient of each of the backlight partitions, and drive each of the backlight partitions according to the gain coefficient of each of the backlight partitions and the partition backlight brightness value of each of the backlight partitions.

The backlight control device in these embodiments may further be configured to execute the technical solutions in the backlight control method provided in the foregoing embodiments of the present disclosure, and implementation principles and technical effects thereof are similar, and details are not described herein again.

In some embodiments, a liquid crystal display device may include a liquid crystal panel 401, a backlight assembly 402, a backlight driver 403, a memory and a processor. The backlight assembly 402 includes backlight resources (not shown) that provide desired backlight for each of backlight partitions. The memory is configured to store instructions and may be implemented by any type of volatile or non-volatile memory devices or a combination thereof. The processor is coupled to the memory and configured to execute the instructions stored in the memory. And the processor is configured to determine, based on a global backlight brightness value, a backlight brightness interval in which the global backlight brightness value is located; determine, according to a correspondence between the backlight brightness interval and a backlight gain coefficient table, a backlight gain coefficient table corresponding to the backlight brightness interval; and determine, according to a partition backlight brightness value of each of backlight partitions and the backlight gain coefficient table, a gain coefficient of each of the backlight partitions; and determine, according to the partition backlight brightness value of each of the backlight partitions and the gain coefficient, a target backlight brightness value of each of the backlight partitions. The backlight driver 403 is configured to drive the backlight source of each of the backlight partitions according to the target backlight brightness value of each of the backlight partitions.

The processor may be further configured to execute the technical solutions of the backlight control method provided in the foregoing embodiments of the present disclosure, and implementation principles and technical effects thereof are similar, and details are not repeated herein.

It should be noted that, the above hardware structure is merely a preferred embodiment for facilitating the description of the embodiments of the present disclosure. In a real application, corresponding hardware units may be combined and integrated or further separated. When the same technical effects can be achieved, changes in specific hardware unit deployment do not affect the scope of the protection of the present disclosure.

Each embodiment in this disclosure is described in a progressive manner, and the same or similar parts in various embodiments may refer to each other, and each embodiment focuses on their differences from other embodiments. For the device or system embodiment, since they are basically similar to the method embodiments, they are described in a relatively simple way, and for the relevant parts, reference may be made to the description of the method embodiments. The embodiments for devices and systems described above are merely exemplary. Units described as separate components may or may not be physically separated. Components shown as units may or may not be physical units, which may be located in one place, or be distributed to multiple network elements.

The above is only specific embodiments of the present disclosure, and it should be noted that those skilled in the art may make some improvements and modifications without departing from the principles of the present disclosure, and those improvements and modifications should also be deemed as falling into the protection scope of the present disclosure.

What is claimed is:

1. A backlight control method, comprising:
determining, based on a global backlight brightness value, a backlight brightness interval in which the global backlight brightness value is located;
determining, according to a correspondence between the backlight brightness interval and a backlight gain coefficient table, a backlight gain coefficient table corresponding to the backlight brightness interval, wherein the backlight gain coefficient table is configured to indicate a gain coefficient corresponding to a partition backlight brightness value;
determining, according to a partition backlight brightness value of each of backlight partitions and the backlight gain coefficient table, a gain coefficient of each of the backlight partitions; and
driving each of the backlight partitions according to the gain coefficient of each of the backlight partition and the partition backlight brightness value of each of the backlight partitions;
wherein a global backlight brightness value range is divided into a plurality of backlight brightness intervals, the plurality of backlight brightness intervals comprise a first backlight brightness interval and a second backlight brightness interval, and a minimum global backlight brightness value of the first backlight brightness interval is greater than a maximum global backlight brightness value of the second backlight brightness interval;
the first backlight brightness interval corresponds to a first backlight gain coefficient table;
the second backlight brightness interval corresponds to a second backlight gain coefficient table; and
in a first alternative mode,
a partition backlight brightness value range of the first backlight gain coefficient table and a partition backlight brightness value range of the second backlight gain coefficient table have an overlapped portion, and the backlight gain coefficient corresponding to the partition backlight brightness value in the overlapped portion, in the first backlight gain coefficient table, is greater than the backlight gain coefficient corresponding to the same partition backlight brightness value in the second backlight coefficient table;
in a second alternative mode,
the first backlight brightness interval and the second backlight brightness interval are adjacent at a first threshold value; a partition backlight brightness value range of the first backlight gain coefficient table is a first backlight brightness interval; a partition backlight brightness value range of the second backlight gain coefficient table is a second backlight brightness interval; and the backlight gain coefficient corresponding to a first partition backlight brightness value nearest to the first threshold value in the first backlight gain coefficient table, is greater than the backlight gain coefficient corresponding to a second partition backlight brightness value nearest to the first threshold value in the second backlight gain coefficient table.

2. The method according to claim 1, wherein the global backlight brightness value is determined based on a global grayscale brightness value of an image or on a user input.

3. The method according to claim 1, wherein the determining, based on a global backlight brightness value, a backlight brightness interval in which the global backlight brightness value is located, comprises:
determining the backlight brightness interval in which the global backlight brightness value is located based on a comparison result between the global backlight brightness value and each of preset threshold values, wherein the backlight brightness interval in which the global backlight brightness value is located is indicated by two adjacent threshold values.

4. The method according to claim 1, wherein a partition backlight brightness value range of the backlight gain coefficient table is same as or greater than that of the backlight brightness interval corresponding to the backlight gain coefficient table.

5. The method according to claim 1, wherein in the backlight gain coefficient table, when a maximum partition backlight brightness value in the backlight gain coefficient table is less than a first backlight brightness value, the gain coefficient increases with an increase of the partition backlight value.

6. The method according to claim 1, wherein in the backlight gain coefficient table, when a first backlight brightness value is between a minimum backlight brightness value and a maximum backlight brightness value in the backlight gain coefficient table, the gain coefficient first increases and then decreases with an increase of the partition backlight brightness value.

7. The method according to claim 1, wherein in the backlight gain coefficient table, when a minimum partition backlight brightness value in the backlight gain coefficient table is greater than a first backlight brightness value, the gain coefficient decreases with an increase of the partition backlight brightness value.

8. The method according to claim 1, wherein the determining, according to a correspondence between a backlight brightness interval and a backlight gain coefficient table, a backlight gain coefficient table corresponding to the backlight brightness interval, comprises:
determining, according to a one-to-one correspondence between the backlight brightness interval and the backlight gain coefficient table, the backlight gain coefficient table corresponding to the backlight brightness interval.

9. A backlight control device, comprising a nonvolatile memory for storing instructions and a processor coupled to the memory, wherein the processor is configured to execute instructions stored in the memory and the processor is configured to:
determine, based on a global backlight brightness value, a backlight brightness interval in which the global backlight brightness value is located;
determine, according to a correspondence between the backlight brightness interval and a backlight gain coefficient table, a backlight gain coefficient table corresponding to the backlight brightness interval, wherein the backlight gain coefficient table is configured to indicate a gain coefficient corresponding to a partition backlight brightness value;
determine, according to a partition backlight brightness value of each of backlight partitions and the backlight gain coefficient table, a gain coefficient of each of the backlight partitions; and
drive each of the backlight partitions according to the gain coefficient of each of the backlight partitions and the partition backlight brightness value of each of the backlight partitions;
wherein a global backlight brightness value range is divided into a plurality of backlight brightness intervals, the plurality of backlight brightness intervals comprise a first backlight brightness interval and a second backlight brightness interval, and a minimum global backlight brightness value of the first backlight brightness interval is greater than a maximum global backlight brightness value of the second backlight brightness interval;

the first backlight brightness interval corresponds to a first backlight gain coefficient table;

the second backlight brightness interval corresponds to a second backlight gain coefficient table; and in a first alternative mode, a partition backlight brightness value range of the first backlight gain coefficient table and a partition backlight brightness value range of the second backlight gain coefficient table have an overlapped portion, and the backlight gain coefficient corresponding to the partition backlight brightness value in the overlapped portion, in the first backlight gain coefficient table, is greater than the backlight gain coefficient corresponding to the same partition backlight brightness value in the second backlight coefficient table;

in a second alternative mode, the first backlight brightness interval and the second backlight brightness interval are adjacent at a first threshold value; a partition backlight brightness value range of the first backlight gain coefficient table is a first backlight brightness interval; a partition backlight brightness value range of the second backlight gain coefficient table is a second backlight brightness interval; and the backlight gain coefficient corresponding to a first partition backlight brightness value nearest to the first threshold value in the first backlight gain coefficient table, is greater than the backlight gain coefficient corresponding to a second partition backlight brightness value nearest to the first threshold value in the second backlight gain coefficient table.

10. The device according to claim 9, wherein the global backlight brightness value is determined based on a global grayscale brightness value of an image or on a user input.

11. The device according to claim 9, wherein the processor is configured to determine the backlight brightness interval in which the global backlight brightness value is located based on a comparison result between the global backlight brightness value and each of preset threshold values, wherein the backlight brightness interval in which the global backlight brightness value is located is indicated by two adjacent threshold values.

12. The device according to claim 9, wherein a partition backlight brightness value range of the backlight gain coefficient table is same as or greater than that of the backlight brightness interval corresponding to the backlight gain coefficient table.

13. The device according to claim 9, wherein in the backlight gain coefficient table, when a maximum partition backlight brightness value in the backlight gain coefficient table is less than a first backlight brightness value, the gain coefficient increases with the an increase of partition backlight brightness value.

14. The device according to claim 9, wherein in the backlight gain coefficient table, when a first backlight brightness value is between a minimum backlight brightness value and a maximum backlight brightness value in the backlight gain coefficient table, the gain coefficient first increases and then decreases with an increase of the partition backlight brightness value.

15. The device according to claim 9, wherein in the backlight gain coefficient table, when a minimum partition backlight brightness value in the backlight gain coefficient table is greater than a first backlight brightness value, the gain coefficient decreases with an increase of the partition backlight brightness value.

16. A liquid crystal display device, comprising:

a backlight assembly, comprising backlight resources:

a liquid crystal panel;

a nonvolatile memory for storing instructions;

a processor coupled to the memory, wherein the processor is configured to execute the instructions stored in the memory and the processor is configured to:

determine, based on a global backlight brightness value, a backlight brightness interval in which the global backlight brightness value is located;

determine, according to a correspondence between the backlight brightness interval and a backlight gain coefficient table, a backlight gain coefficient table corresponding to the backlight brightness interval, wherein the backlight gain coefficient table is configured to indicate a gain coefficient corresponding to a partition backlight brightness value; and determine, according to a partition backlight brightness value of each of backlight partitions and the backlight gain coefficient table, a gain coefficient of each of the backlight partitions; and determine, according to the gain coefficient of each of the backlight partitions and the partition backlight brightness value of each of the backlight partition, a target backlight brightness value of each of the backlight partitions; and a backlight driver configured to drive the backlight resource of each of the backlight partitions according to the target backlight brightness value of each of the backlight partitions;

wherein a global backlight brightness value range is divided into a plurality of backlight brightness intervals, the plurality of backlight brightness intervals comprise a first backlight brightness interval and a second backlight brightness interval, and a minimum global backlight brightness value of the first backlight brightness interval is greater than a maximum global backlight brightness value of the second backlight brightness interval;

the first backlight brightness interval corresponds to a first backlight gain coefficient table;

the second backlight brightness interval corresponds to a second backlight gain coefficient table; and in a first alternative mode, a partition backlight brightness value range of the first backlight gain coefficient table and a partition backlight brightness value range of the second backlight gain coefficient table have an overlapped portion, and the backlight gain coefficient corresponding to the partition backlight brightness value in the overlapped portion, in the first backlight gain coefficient table, is greater than the backlight gain coefficient corresponding to the same partition backlight brightness value in the second backlight coefficient table;

in a second alternative mode, the first backlight brightness interval and the second backlight brightness interval are adjacent at a first threshold value; a partition backlight brightness value range of the first backlight gain coefficient table is a first backlight brightness interval; a partition backlight brightness value range of the second backlight gain coefficient table is a second backlight brightness interval; and the backlight gain coefficient corresponding to a first partition backlight brightness value nearest to the first threshold value in the first backlight gain coefficient table, is greater than the backlight gain coefficient corresponding to a second partition backlight brightness value nearest to the first threshold value in the second backlight gain coefficient table.

* * * * *